United States Patent

Gutowski et al.

Patent Number: 5,872,190
Date of Patent: *Feb. 16, 1999

[54] SURFACE TREATMENT OF RUBBERS AND RUBBER-BASED MATERIALS

[75] Inventors: Wojciech S. Gutowski, Frankston; Dong Y. Wu; Sheng Li, both of Mount Waverley, all of Australia

[73] Assignee: Commonwealth Scientific and Industrial Research Organization, Campbell, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 676,327
[22] PCT Filed: Jan. 24, 1995
[86] PCT No.: PCT/AU95/00034
§ 371 Date: Jul. 19, 1996
§ 102(e) Date: Jul. 19, 1996
[87] PCT Pub. No.: WO95/19995
PCT Pub. Date: Jul. 27, 1995

[30] Foreign Application Priority Data

Jan. 25, 1994 [AU] Australia ............... PM 3490

[51] Int. Cl.$^6$ .................. C08C 19/12
[52] U.S. Cl. .......... 525/359.4; 525/370; 525/342; 525/356; 525/359.3; 525/359.2; 525/359.1; 525/332.8; 525/332.9; 525/333.1; 525/333.2; 525/332.3; 522/113; 522/126; 204/157.62
[58] Field of Search ............... 522/113, 126; 525/332.3, 370, 342, 356, 359.4, 359.3, 359.2, 359.1, 332.8, 332.9, 332.1, 333.2; 204/157.62

[56] References Cited

U.S. PATENT DOCUMENTS

| | | | |
|---|---|---|---|
| 3,553,857 | 1/1971 | Pettit et al. | 36/32 |
| 3,890,664 | 6/1975 | Hanson | 12/146 B |
| 3,899,378 | 8/1975 | Wragg et al. | 156/73.5 |
| 4,500,685 | 2/1985 | Ogawa et al. | 525/343 |
| 4,824,692 | 4/1989 | Gillick et al. | 427/53.1 |
| 5,070,041 | 12/1991 | Katayama et al. | 437/214 |
| 5,122,438 | 6/1992 | Nogami et al. | 430/303 |
| 5,143,980 | 9/1992 | Kimura et al. | 525/358 |
| 5,225,309 | 7/1993 | Suzuki et al. | 430/158 |
| 5,382,635 | 1/1995 | McInnis et al. | 525/356 |

FOREIGN PATENT DOCUMENTS

| | | | |
|---|---|---|---|
| 868294 | 12/1941 | France | C09J 5/02 |
| 2208348 | 6/1974 | France | B44D 5/00 |
| 787217 | 9/1995 | France | 430/303 |
| 1942431 | 3/1970 | Germany | A71C 25/04 |
| 1500296 | 2/1978 | United Kingdom | C08J 5/12 |

OTHER PUBLICATIONS

Derwent Abstract 77–03120Y (Japan Atomic Energy Res) Japanese Abstract JP, 51–137796, Nov. 27, 1976.
Aldrich Catalog Handbook of Fine Chemicals, 1996, p. 1334, Jan. 1, 1996.

*Primary Examiner*—Christopher D. Rodee
*Assistant Examiner*—Steven H. VerSteeg
*Attorney, Agent, or Firm*—Pillsbury Madison & Sutro, LLP Intellectual Property Group

[57] ABSTRACT

A method of increasing the adhesion of a rubber (as hereinbefore defined) or rubber-based material which includes treating at least part of the surface of the rubber or rubber-based material with a halogenating agent simultaneously with a static and/or high freguency alternating physical field.

11 Claims, No Drawings

SURFACE TREATMENT OF RUBBERS AND RUBBER-BASED MATERIALS

This application is a national filing of PCT International application No. PCT AU95-00034 filed an Jan. 24, 1995 in Australia.

BACKGROUND OF THE INVENTION

1. Field of the Invention

This invention relates to new methods of treating the surface of rubber and rubber-based materials to improve their ability to be bonded to other materials. For example, to improve their ability to be bonded to any type of adhesive (including sealants) and, matrix materials including, but not limited to, thermoset or thermoplastic polymers and inorganic matrices.

2. Description of Related Art

By the term "rubber" as used here in the description and claims we mean any natural or synthetic rubbers, their mixtures and/or their blends and/or their alloys with polymers. Examples of suitable rubbers and rubber based materials for use in the invention include, but are not limited to, natural rubber, ethylene-propylene diene rubber, synthetic cis-polyisoprene, butyl rubber, nitrile rubber, copolymers of 1,3-butadiene with other monomers, for example styrene, acrylonitrile, isobutylene or methyl methacrylate, and ethylene-propylene-diene terpolymer. While it is preferred that the rubber be vulcanised, the composition of the present invention can also be formed using virgin or devulcanised rubber. The term "vulcanised rubber" as used herein includes vulcanised rubbers and vulcanised rubbers bound with fillers, additives, and the like. Examples, of filler and additives include carbon black, silica, fiber, oils, and zinc oxide.

In a preferred application of the invention, it is desirable to form a strong and durable adhesive bond between a rubber or rubber based material in the form of flat sheet, film, woven fabric, fiber, web or particulate and adhesive and other polymeric binder and/or matrix material or non-polymeric binder or matrix materials.

In order for the adhesive bond or composite material to perform satisfactorily, there must be good adhesion between the rubber or rubber material (e.g. flat sheet, fiber, or particulate) and the adhesive or the matrix (e.g. thermoplastic or thermoset polymers or non-polymeric materials). Preferably the halogenating agent is selected from the group consisting of aqueous or organic solvent-based chlorine, iodine, and bromine solutions and acidified hypochlorite solutions. However, it is well known that many vulcanised natural or synthetic rubbers and/or their mixtures with polymers are difficult to bond due to the absence of specific surface functional groups and/or molecular structure capable of providing reactive sites for strong interfacial interactions such as mechanical entanglement, acid-base interactions, and/or the formation of chemical bonding (e.g. covalent or ionic, etc) between the untreated substrate and the adhesive or matrix material.

Typical surface treatments for enhanced adhesion of rubbers and rubber-based materials include: mechanical abrasion; corona discharge, plasma treatment, photo-chemical treatment, and surface halogenation with the use of free halogen in aqueous or organic solutions or in gaseous phase, and/or inorganic and organic halogenating agents.

In the prior art halogenating agents are used in solutions at concentrations of 0.5 to 5% per weight, preferably at 1 to 3%. In order for the solution of the halogenating agent to be effective, its concentration should be greater than 0.5%, otherwise the adhesion enhancement is insignificant. At lower concentrations, i.e. below 0.5% the solutions of halogenating agents in known applications are ineffective due to the lack of sufficient interfacial chemical activity between the rubber surface and the active species in the solution.

SUMMARY OF THE INVENTION

It has now been found, surprisingly, that the ability of rubber or rubber based materials to be durably bonded may be improved by the use of very low concentrations, and/or otherwise previously ineffective concentrations of halogenating agents by suitable co-treatment steps.

Thus, in its broadest aspect the present invention provides a method of increasing the adhesion of rubber or rubber based material which includes treating at least part of the surface of the rubber or rubber based material with a halogenating agent simultaneously with a static and/or a high frequency alternating physical field.

DESCRIPTION OF THE PREFERRED EMBODIMENTS

Any suitable halogenating agent may be used in the method of the invention. Suitable known halogenating agents include inorganic and/or organic halogenating agents in an aqueous or non-aqueous solvent. The halogenating agents may be present in a single solvent or in a mixture of solvents.

Preferred organic halogenating agents include the various N-halohydantoins, the various N-haloimides, the various N-haloamides, N-chlorosulphonamides and related compounds, N,N'-dichlorobenzoylene urea and sodium and potassium dichloroisocyanurate. Examples of various N-halohydantoins include 1,3-dichloro-5,5-dimethyl hydantoin; 1,3-dibromo-5,5-dimethyl hydantoin; 1,3-dichloro5i-methyl-5-isobutyl hydantoin; and 1,3-dichloro-5-methyl-5-hexyl hydantoin. Examples of N-haloamides include N-bromoacetamide, tetrachloroglycoluril, and dichloro derivatives of glycoluril. Examples of N-haloimides include N-bromosuccincimide, N-chlorosuccinimide and the various chloro substituted s-triazinetriones, commonly known as mono-, di-, and tri-chloroisocyanuric acid. Examples of N-chlorosulfonamides and related compounds include chloramine-T. Preferred organic halogenating agents for use in the present invention are the various mono-, di-, or tri-chloroisocyanuric acids, or their combinations. Trichloroisocyanuric acid is especially preferred.

The organic halogenating agents usually exist in solid form, so that various solvents are used for preparing solutions such as esters where the acid portion has from 1 to 5 carbon atoms and the alcohol portion has from 1 to 5 carbon atoms. Examples include methyl acetate, ethyl acetate, ethyl propionate, butyl acetate, and the like, as well as their mixtures. Other solvents that can be used are ethers, ketones, and the like. Solvents which react with the halogenating agents such as toluene should be avoided.

Preferred inorganic halogenating agents for use in the invention include acidified hypochlorite solutions, chlorine in $CCl_4$, and hydrochloric acid in organic solvents. An acidified aqueous solution of sodium hypochlorite is especially preferred.

The surface may be treated by the halogenating agent by any suitable method. The mode of treatment will necessarily depend upon the state of the halogenating agent to be used. For example, the halogenating agent may be in a solution or dispersion or a vapor, or may be applied as a gas or gas mixture.

The amount or concentration of halogenating agent will depend upon the type of surface to be treated, the method of treatment and the result desired. For example, concentrations of less than 0.5% by weight of halogenating agents in solution may be used. Preferably, the concentration of halogenating agent is in the range of 0.05% to 0.25% by weight.

Any suitable static and/or high frequency alternating physical field such as but not limited to ultrasonic, radiofrequency, microwave, and/or heat energy may be used in the invention. In a preferred embodiment ultrasonic energy is used. In another embodiment ultrasonic energy in combination with heat may be used.

The static and/or high frequency alternating physical field may be applied for a period of time to achieve the desired result and will depend on the type of surface to be treated and the method of treatment. Typically, the period of time will be in the range of 0.1 sec. to 10 mins. Most preferably, 10 to 30 seconds.

If heat is used in this step then the preferred temperature is within the range of 30° C. to 100° C. More preferably the temperature is about 60° C.

If ultrasonic energy is used the preferred frequency range of the ultrasonic energy is between 1 to 500 kHz, more preferably between 10 to 50 kHz.

The method of the invention may be used on its own or as part of an overall surface treatment of a rubber or rubber based material. For example the method of the invention may be combined with any other known surface treatment such as mechanical abrasion; surface oxidation by corona discharge or an oxidizing agent; plasma treatment; UV irradiation; or chemical grafting by the use of but not limited to coupling and chelating agents.

If the method of the invention is used as part of an overall surface treatment then it is preferably used as the first step in the overall treatment.

In a preferred embodiment, the method of the invention is combined with surface oxidation by corona discharge or by the use of an oxidizing agent.

In another preferred embodiment, the method of invention is combined with the treatment of rubber or rubber based material with one or more coupling agents and/or chelating agents either in a two step process after the method of invention or alternatively in a single step process where the halogenating agent is applied onto the rubber surface by an admixture of the halogenating agent and the coupling and/or chelating agent (s) dissolved in a common aqueous or organic solvent. The organo-functional coupling agent or chelating agent is chosen in this way that it does not react with the halogenating agent. The percentage of the coupling or chelating agent in the mixture is preferably from 0.05% to 20%, more preferably from 0.25% to 10% by weight.

Preferably, the functional groups introduced to the surface by the use of an organo-functional coupling agent and/or chelating agent are one or more of the groups selected from amino, hydroxyl, ether, carbonyl, carboxyl, nitrile, chloro, isocyanato, mercapto, and /or other type(s) functional groups capable of undergoing physical-chemical and/or chemical interactions with the adhesive or matrix materials.

Any suitable organo-functional coupling agent or chelating agent may be used. These coupling agents may be applied from solution, vapor or any type of mechanical dispersion of a pure coupling agent or their solution and/or mixtures in any suitable solvent.

In a preferred embodiment an organo-silicon or organo-metallic compound is used. Suitable organosilicon compounds include organo-functional silanes. Suitable organo-metallic compounds include organo-titanates, organo-zirconates, and organo-aluminates. The organosilicon and/or organo-metallic compounds may be applied for 0.1 sec. to 30 mins at concentrations of 0.000001–98%. More preferably, the compounds are applied for 1 to 30 sec. at concentrations of 0.0001–0.5%. Mixtures of the above mentioned compounds may also be used.

When an organo-functional silane is used, it has the general structure $X_n SiY_{4-n}$, X is an non-hydrolyzable orga-nofunctional group and Y is an hydrolyzable group, n is an integer from 1 to 3.

In a first preferred embodiment of the invention, there is provided a method of increasing the adhesion or compatibility of a rubber or rubber based material to an adhesive or a matrix material, which includes the subsequent steps of:

(i) treating at least part of the surface with at least one halogenating agent simultaneously with a static and/or high frequency alternating physical field, and (ii) treating the treated surface with at least one coupling agent or chelating agent.

Alternatively, there is provided method of increasing the adhesion or compatibility of a rubber or rubber based material to an adhesive or a matrix material, which involves treating at least part of the surface with an admixture of a halogenating agent and at least one coupling agent or chelating agent simultaneously with a static and/or high frequency alternating physical field. The organo-functional coupling agent or chelating agent used in this embodiment is selected by its ability to function as a coupling agent and its ability not to react with the halogenating agent. The percentage of the coupling or chelating agent in the mixture is preferably from 0.05% to 20%, more preferably from 0.25% to 10% by weight. The preferred concentration of halogenating agent is in the range of 0.05% to 0.25% by weight.

In another preferred embodiment of the invention, there is provided a method of increasing the adhesion or compatibility of a rubber or rubber based material to an adhesive or a matrix material, which includes the subsequent steps of:

(i) treating at least part of the surface with at least one halogenating agent simultaneously with a static and/or high frequency alternating physical field, and (ii) subjecting the treated surface to an oxidation treatment.

Any suitable surface oxidation treatment may be used to oxidize the surface. For example, the surface may be oxidized by corona discharge, plasma, UV irradiation, flame treatment and/or a chemical oxidizing agent.

Following treatment of a rubber or rubber based material by the method of invention, any suitable adhesive or matrix material may be applied to the treated surface. Examples of suitable adhesives include, but are not limited to, epoxy, polyurethane, sealants, contact adhesive, etc. Examples of suitable polymeric matrix materials include, but are not limited to, polyolefins, polyurethane, polysulfide, polyester, polyamide, etc. Example of suitable inorganic matrix material include, but not limited to, cement, gypsum, etc.

Alternatively, following the treatment of a rubber or rubber based material by the method of the invention, it may be painted, printed or have a coating directly applied to the treated surface.

The invention is further described in and illustrated by the following examples. These examples are not to be construed as limiting the invention in any way.

EXAMPLE 1

The effectiveness of the present invention is demonstrated with the following experiments involving a blend of natural rubber (NR)/styrene-butadiene rubber (SBR).

The efficiency of the surface treatment process was assessed by determining the peel strength of the bonded rubber specimens at 180° peel. The specimens were prepared using an ASTM-C794 Standard.

Rubber was treated by the following alternative means:
1. Untreated with ethanol wipe only 2. Immersion in ethyl acetate based solutions of trichloroisocyanuric acid (TIC) at various concentrations.
3. Immersion in ethyl acetate based solutions of trichloroisocyanuric acid (TIC) at various concentrations with the simultaneous application of a static or high frequency alternating physical field, i.e. ultrasonic vibration (35 kHz, 35 W).

Adhesive bonding was carried out using various types of adhesives, i.e. thermoset epoxy adhesives: Ciba Geigy Araldite 138; thermoset polyurethane adhesive: Lord Corporation Tyrite 7520 A/B; and thermoplastic adhesive: Bostic hot-melt adhesive.

The specimens were tested for dry adhesion 72 hours after bonding. Tests were carried out on an Instron mechanical tester at the cross-head speed of 10 mm/min at room temperature (21±2° C.)

Table I shows the results obtained upon treating NR/SBR through the immersion in TIC solutions in ethyl acetate at various concentrations for 10 sec, and then bonding with polyurethane adhesive Tyrite 7520 A/B.

The results in Table I show that in order for a TIC solution in ethyl acetate to be effective, the TIC concentration must be at least 0.5%. Otherwise the adhesion enhancement is not sufficient as shown by an extensive delamination of adhesive from the rubber substrate when the solution contained 0.25% or less TIC. It is also noticeable that 0.1% TIC solution is ineffective; the bond strength is so weak the substrates virtually fall apart during their installation in the testing machine.

TABLE I

Peel strength (J/m$^2$) of NR/SBR rubber bonded with Tyrite 7520 A/B

| TIC concentration [%] | Peel strength (J/m$^2$) | Failure mode |
| --- | --- | --- |
| Untreated | 17 | AF |
| 0.1 | 274 | AF |
| 0.25 | 2753 | 70AF/30CF |
| 0.5 | 3943 | CF |
| 1.0 | 4256 | CF |

Note:
AF: delamination at the rubber/adhesive interface
CF: 100% cohesive failure in rubber substrate
70AF/30CF: 70% delamination/30% cohesive failure in rubber substrate.

Table II below shows the results obtained upon treating NR/SBR rubber through immersion in various concentrations of TIC solutions with or without the simultaneous exposure of the treating solution to a high-frequency alternating ultrasonic field (35 kHz, 35 W).

The results from Table II show that treatment of rubber through immersion in a 0.1% or 0.25% TIC solution with the simultaneous application of ultrasonic vibration (35 kHz, 35 W) results in a spectacular increase in the efficiency of the surface treatment. This is shown by a significant increase in the peel strength of such treated rubber to the three types of adhesives used. In addition there is also a change of the failure mode from interfacial or mostly interfacial failure in the case of simple immersion in 0.1% and 0.25% TIC solutions, to 100% cohesive failure within the rubber substrate when ultrasonic vibration was applied simultaneously during the treatment.

Table III illustrates the efficiency of the TIC treatments on natural rubber and butyl rubber using a 0.25% TIC solution in ethyl acetate with the simultaneous application of ultrasonic vibrations.

TABLE III

Peel strength (J/m$^2$) of untreated and surface treated natural or butyl rubber bonded to an epoxy adhesive (Araldite 138)

| Surface treatment | Natural rubber | Butyl rubber |
| --- | --- | --- |
| untreated | 142 | 0 |
| 0.25% TIC (U/S, 35 kHZ, 35 W, 20° C.) | 7120 CF | 608 AF |
| 0.25% TIC (U/S, 35 kHZ, 200 W, 20° C.) | — | 5330 70% CF |

It can be seen from Table III that surface chlorination of the natural rubber by 0.25% of TIC solution in ethyl acetate with simultaneous exposure to a relatively low level of ultrasonic energy (35 kHz, 35 W) leads to a significant improvement in the adhesion of the treated natural rubber to the epoxy adhesive. In contrast, under the same treatment condition (i.e. 0.25% TIC with ultrasonic energy 35 kHz, 35 W) it was found that the butyl rubber was not sufficiently treated as indicated by the resultant interfacial delamination with low peel strength (608J/m$^2$). This is probably related to fact that butyl rubber is one of the most difficult rubbers to be modified. On the other hand, it is found that the efficiency of surface chlorination on butyl rubber by TIC can be greatly improved by increasing the energy level of the ultrasonic vibration (i.e. 35 kHz, 200 W) as shown in the Table III.

EXAMPLE 2

In this example, samples of NR/SBR rubber were treated by acidified sodium hypochlorite solutions at various con-

TABLE II

Peel strength (J/m$^2$) of NR/SBR rubber bonded to polyurethane adhesive (Tyrite 7520 A/B)

| | Epoxy Araldite | | PU Tyrite | | Hot Bostic melt | |
| --- | --- | --- | --- | --- | --- | --- |
| TIC concentration [%] | 30 s immersion | 30 s immersion in U/S | 30 s immersion | 30 s immersion in U/S | 10 s immersion | 10 s immersion in U/S |
| 0.1% | 274 AF | 4258 CF | 789 80% AF | 2454 80% CF | 1478 AF | 3304 50% CF |
| 0.25% | 2753 70% CF | 4299 CF | 2857 80% CF | 4207 CF | 1739 80% AF | 5565 CF |

Note:
AF: delamination at the substrate/adhesive interface
CF: cohesive failure in rubber substrate.
U/S: ultrasonic vibration (35 kHz, 35 W)

centrations with or without simultaneous application of a static or high frequency alternating physical field, i.e. ultrasonic vibration.

The acidified hypochlorite solutions were prepared by the addition of 2 ml concentrated hydrochloric acid (HCl) to each solution referred to in Table IV.

TABLE IV

Peel strength (J/m$^2$) of NR/SBR rubber bonded with epoxy adhesive (Araldite 138)

| NaOCl concentration [% by volume] | Immersion 30 s | Immersion 30 s in U/S |
|---|---|---|
| 0.1 | 0 | 320 AF |
| 0.25 | 226 AF | 688 40% CF |
| 0.5 | 4485 90% CF | 5100 CF |
| 1.0 | 4784 CF | 4927 CF |

The results of the above table clearly indicate that the rubber surface can be more effectively modified by acidified sodium hypochlorite solution when applied simultaneously with ultrasonic energy. In particular it can be seen that for solutions of less than 0.5% NaOCl that effective modification is not achieved unless the solution is applied simultaneously with ultrasonic energy.

EXAMPLE 3

In this example, we show the effectiveness of the surface treatment of rubber, according to the invention, in which the substrate is firstly treated in a weak, otherwise ineffective solution of TIC with simultaneous exposure to a high frequency alternating physical field, and then exposing the resultant surface to air corona discharge.

Data in Table V shows the results of the experiments, in which NR/SBR rubber substrates were first pre-activated by 30s immersion in a 0.1% solution of TIC in ethyl acetate with ultrasonic field (35 kHz, 35 W), then followed by treating the chlorinated rubber surface under air corona discharge applied at the level of 76 mJ/mm$^2$.

TABLE V

Peel strength (J/m$^2$) of NR/SBR bonded to an epoxy (Araldite) or a polyurethane (Tyrite) adhesive

| Treatment | Epoxy (Araldite 138) | PU (Tyrite 7520 NB) |
|---|---|---|
| 0.1% TIC (U/S 30 s) | 2454 80% CF | 4258 CF |
| 0.1% TIC (U/S 30 s) + air corona (76 mJ/mm$^2$) | 4735 CF | 5035 CF |

Analysis of the data in Table IV suggests that although the combination of a weak TIC solution (0.1% in ethyl acetate) and ultrasonic energy (35 kHz, 35 W) significantly increases the bond strength and results in a transition from purely interfacial delamination to mixed 20% AF/80% CF failure, further improvement of adhesion of such chlorinated rubber to both epoxy and the polyurethane adhesives can still be achieved by the second step of surface oxidation, i.e. air corona treatment, as shown in the Table.

EXAMPLE 4

The last aspect of the invention is associated with the treatment of a rubber or rubber based material by the combination of surface halogenation and the application of at least one coupling agent or chelating agent.

In a one step process of the present invention, the NR/SBR rubber was treated by immersing in a premixed solution containing 0.1% silane coupling agent (Dow Corning Z-6076: 3-chloropropyltrimethoxy silane) and 0.1 or 0.25% TIC in ethyl acetate with or without simultaneous exposure to high-frequency alternating physical field such as, but not limited to the ultrasonic energy (35 kHz, 35 W). The organofunctional or organo-metallic coupling agent or chelating agent is chosen in this way that it does not react with the halogenting agent and is equipped with the organo-functional groups capable of reacting with the chosen adhesives or matrix materials.

Table VI below illustrates the effectiveness of this aspect of the current invention.

TABLE VI

Peel strength (J/m$^2$) of NR/SBR rubber bonded to an epoxy adhesive (Araldite 138)

| TIC concentration [%] | TIC Solution with no silane | | TIC solution with 0.1% Z-6076 | |
|---|---|---|---|---|
| | 10 s immersion | 10 s in U/S | 10 s immersion | 10 s in U/S |
| 0.1 | 217 AF | 3043 30% AF/ 70% CF | — | — |
| 0.25 | 2870 50% AF/ 50% CF | 4250 CF | 4330 CF | 5652 CF |

It is noticeable from Table VI that, treatment of the rubber through a single stage immersion in the solution comprising 0.25% TIC and 0.1% of chloro-functional silane (Z-6076) in ethyl acetate, provides an increase of the peel strength by 50% and significantly increases the percentage of cohesive failure within the rubber substrate (from 50% to 100%).

In an alternative, any suitable coupling or chelating agent (s) can be applied onto the rubber surface in a two step treatment process comprising surface chlorination as the first stage of treatment followed by the application of the coupling or chelating agent(s). Such process is especially preferred in the case where the halogenating agent and the organo-functional coupling agent are either not miscible or compatible or it is desired to avoid the occurrence of certain chemical reactions between them. Examples of such treatment are shown in Table VI where the NR/SBR rubber was firstly chlorinated by immersion in a 0.25% TIC in ethyl acetate with simultaneous application of ultrasonic energy (35 kHz, 35 W), then the chlorinated surface was further functionalized by immersion in a isopropanol solution containing 0.25% of an amino-silane (Z-6020), or a chloro-silane (Z-6020), or an isocyanato-silane (Y-9030). The efficiency of various surface treatments was then assessed by testing the peel strengths of the surface treated rubber bonded to an epoxy (Araldite 138) or a polyurethane (Tyrite 7520 A/B) adhesive.

TABLE VII

Peel strength (J/m$^2$) of surface treated NR/SBR rubber bonded to an epoxy (Araldite 138) or a polyurethane (Tyrite 7520 NB) adhesive

| Surface treatment | Epoxy | Polyurethane |
|---|---|---|
| 0.25% TIC (U/S 30 s) | 4207 | 4299 |
| 0.25% TIC (U/S 30 s) + 0.25% Z6020 (dip 30 s) | 5310 | 5160 |

TABLE VII-continued

Peel strength (J/m$^2$) of surface treated NR/SBR rubber bonded to an epoxy (Araldite 138) or a polyurethane (Tyrite 7520 NB) adhesive

| Surface treatment | Epoxy | Polyurethane |
|---|---|---|
| 0.25% TiC (U/S 30 s) + 0.25% Z6076 (dip 30 s) | 5140 | 5770 |
| 0.25% TIC (U/S 30 s) + 0.25% Y-9030 (dip 30 s) | 5340 | 6010 |

From the above table, it is indicated that further surface functionalization of the rubber surface after the first step of surface chlorination indeed leads to further improvement of the adhesion to the two types of adhesives used.

It will be understood by those skilled in the art that numerous variations and/or modifications may be made to the invention as desired without departing from the spirit or scope of the invention. The present examples and specific details are, therefore, to be considered in all respects as illustrative of the invention and not restrictive.

We claim:

1. A method for increasing the bonding capability of solid vulcanized rubber material with other materials, which method comprises the steps of:
    (i) treating at least part of a surface of said solid vulcanized rubber material with a halogenating agent while simultaneously subjecting said surface to a static and/or high frequency physical field to provide a halogenated surface; and
    (ii) treating the halogenated surface with at least one coupling agent.

2. A method according to claim 1, wherein the step of treating at least part of said surface of said solid vulcanized rubber material with a halogenating agent further includes simultaneous application of an ultrasonic field, a microwave field, a radio frequency or combination thereof.

3. A method for increasing the bonding capability of solid vulcanized rubber material with other materials, which method comprises the steps of:
    (i) treating at least part of a surface of said solid vulcanized rubber material with a halogenating agent while simultaneously subjecting said surface to heat in a range of from 30° C. to 100° C. to provide a solid vulcanized rubber material having a halogenated surface; and
    (ii) treating the halogenated surface with at least one coupling agent.

4. A method according to claim 3, wherein the halogenating agent is selected from the group consisting of aqueous chlorine, organic solvent-based chlorine, iodine, and bromine solutions and acidified hypochlorite solutions.

5. A method according to claim 4, wherein the halogenating agent is an acidified hypochlorite solution.

6. A method according to claim 5, wherein the acidified hypochlorite solution has a concentration of from 0.5% to 5% by weight.

7. A method according to claim 5, wherein the acidified hypochlorite solution has a concentration of from 0.05% to 0.25% by weight.

8. A process according to claim 3, wherein the halogenating agent is selected from the group consisting of N-halohydantoins, N-haloimides, N-haloamides, N-chlorosulfonamides, N,N'-dichlorobenzoylene urea, sodium and potassium dichloroisocyanurate and mixtures of two or more thereof.

9. A method according to claim 3, wherein the halogenating agent is a chloroisocyanuric acid.

10. A method according to claim 9, wherein the chloroisocyanuric acid is in a solution at a concentration of less than 0.5% by weight.

11. A process according to claim 3, wherein the coupling agent is selected from the group consisting of organo-silicon compounds, organo-titanates, organo-zirconates, organo-aluminates and mixtures of two or more thereof.

* * * * *